United States Patent Office 3,519,606
Patented July 7, 1970

3,519,606
POLYSULFIDE CATALYSTS
Anthony B. Conciatori, Chatham, N.J., assignor to Celanese Corporation, New York, N.Y., a corporation of Delaware
No Drawing. Continuation of application Ser. No. 701,476, Jan. 29, 1968, which is a continuation of application Ser. No. 466,838, June 24, 1965. This application Feb. 24, 1969, Ser. No. 805,961
Int. Cl. C08g 23/00
U.S. Cl. 260—79          8 Claims

ABSTRACT OF THE DISCLOSURE

This specification discloses novel catalysts for the preparation of sulfide polymers. The polymers have utility in the manufacture of textiles. For example, ethylene sulfide is polymerized in the presence of a catalytic amount of a reaction product of zinc chloride and butyl mercaptan.

---

This is a continuation of application Ser. No. 701,476, filed Jan. 29, 1968, now abandoned, said Ser. No. 701,476 being a continuation of Ser. No. 466,838 filed June 24, 1965, now abandoned.

This invention relates to sulfur polymers, and to a novel catalytic process for their preparation. More particularly, it relates to a catalytic process for the preparation of high molecular weight, thermoplastic fiber-forming polymers of excellent color from organic sulfides, and especially the alkyl sulfides.

A variety of sulfur polymers, generally of low molecular weight and often of poor color, have been described in the literature. Specifically, mention is made of certain very low molecular weight species of polyalkyl sulfides in U.S. Pat. No. 2,094,914 issued to Dachlauer on Oct. 5, 1937, U.S. Pat. No. 2,962,457 issued to MacKinney on Nov. 29, 1960; certain aromatic and aliphatic polymers of low molecular weight are reported in J. Poly. Sci., vol. 54, pp. 533–541 (1961) by Noshay and Price, in J. Amer. Chem. Soc., vol. 71 (1949) by Hurd and Wilkinson, and in Compt. Rend. 252, No. 6, pp. 882–4 (1961) by Bouleau and Sigwalt; and uncharacterized homopolymers are reported in U.S. Pat. No. 3,083,232, issued to Lissant on Mar. 26, 1963. Certain copolymers are reported by Lal et al. in J. Poly. Sci., vol. 50, pp. 13–19 (1961), and thiomethylene polymers are described in U.S. Pat. No. 3,070,580 issued to Harmon on Dec. 25, 1962.

Improved polymers of more recent origin are reported, for example, in French Pat. 1,374,836 issued Nov. 18, 1963, and Canadian Pat. 702,331 and 702,315, each issued Jan. 19, 1965.

Where the desired end use for the product lies in an area where polymer color is immaterial or its strength characteristics relatively unimportant, these polymers and the processes described for their preparation are often sufficient. However, a textile utility, such as that envisaged by this description, dictates substantial concern for the color, strength and other physical characteristics of the fiber, and heretofore such properties could not be provided by reference to known processes.

These properties have now been obtained with a novel catalytic process which essentially comprises charging an organic sulfide monomer feed comprising a major proportion of at least one aliphatic sulfide, optionally as a solution in an inert organic solvent, in bulk or as a continuous gradual feed, to a reaction medium comprising a catalytic proportion of a Group II metal halide and an organic mercaptan, or a preformed reaction product thereof, maintaining the reaction zone under polymerization conditions, e.g. a temperature of between about −80 and about 60° C. and a pressure of ½ atm. to 2 atm., optionally under an inert gas blanket, and recovering in conventional fashion the improved product of this invention.

The polymers are solid, moldable products capable of being spun into strong fibers of excellent color from a melt which is stable at temperatures as high as 230° C.

The organic sulfides which may be polymerized according to this invention contain at least one thiirane group, i.e. a

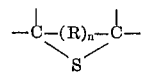

moiety, wherein R is a

group and $n$ is an integer from 0 to 1. The thiirane group thus may be of 1,2 or 1,3 configuration, corresponding to the

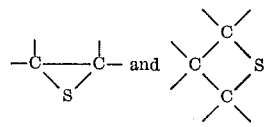

groups, respectively, and may be referred to in radical form as 1,2 thiiryl, 1,2 thiirylene, 1,3 thiiryl, etc., or by referring solely to the sulfur substituents as 1,2 thia; 1,3 thia, etc.

The sulfides are generally hydrocarbon in nature, although it should be understood that the presence of a minor proportion of heteroatoms, e.g. oxygen, nitrogen, etc., in substituent groups or as part of the principal structural moiety generally will not adversely affect operability. In order to afford the desired fiber-forming characteristics, the monomer feed comprises a major proportion (i.e. more than 50 mol percent and preferably more than 75 mol percent) of aliphatic (including cycloaliphatic) sulfides which may be substituted or unsubstituted, but are preferably free of unsaturation. Generally, these sulfides comprise up to about 20 carbon atoms in a saturated carbonaceous backbone. Most preferably the lower alkyl derivatives having up to about 8 carbon atoms are employed. Suitable substituents include alkyl, cycloalkyl, halogen, such as iodine, chlorine and bromine, haloakyl, cyano, nitro, hydroxy, carboxy, alkoxy, such as methoxy or ethoxy, etc., or any otherwise suitable inert saturated substituent, i.e. one that does not substantially adversely affect the reaction under the reaction conditions. Therefore, the substituents $R_1$–$R_4$ appearing in the formula

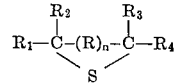

may be hydrogen, halogen, haloalkyl, nitro, hydroxy, cyano, alkoxy, carboxy, alkyl, cycloalkyl, etc. as set forth above and $R_1$ and $R_2$, $R_2$ and $R_3$, $R_3$ and $R_4$, etc., may form a unitary aliphatic carbocyclic structure, or a heterocycle comprising one or more nitrogen or oxygen atoms.

Of course, where the organic sulfide comprises more than one thiirane group, any of the foregoing organic substituents may form the bridging radical, e.g. alkylene, etc. and the $R_1$ and $R_4$ radicals, for example, may be combined in such bridging radical, as in methylene bis (1,2 thiirane)

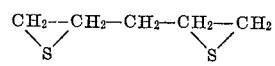

or cyclohexylene bis (1,2 propylene sulfide)

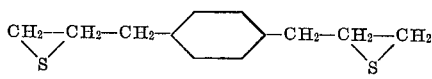

In each case the thiacyclic organic radical designated as R is a

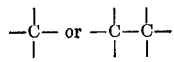

group wherein the valences are satisfied by hydrogen, halogen, lower alkyl having up to about 5 carbon atoms, or any other inert substituent as described above.

Representative such organic sulfides include ethylene sulfide, propylene sulfide, butylene sulfide, isobutylene sulfide, isopropylene sulfide, 1,2 thia-3,3 dichlorobutane, butyl thio glycidyl ether, 1,2 thia-3,3 dichloromethyl pentane, 1,2 thiapentanoic acid, 2-methoxy thiacyclobutane, 3,3 diiodomethyl thiacylobutane, 3,3 dimethylthiacyclobutane, 1,2 thiapentane, 2-isopropoxy-9,10 thiadecane, 4-cyano, 1,2 thiabutane, 6-thiabicyclo [3.1.0] hexane, 7-thiabicyclo [4.1.0] heptane, 1-thiaspiro [2.5] octane, 2-thiaspiro [3.5] nonone, 2,6-dithiaspiro [3.3] heptane, thietane, 2-thi-4-azabicyclo [1.1.0] butane, 1-thiaspiro [2.3] hexane, 1-thiaspiro [2.2] pentane, 1,4 dithiaspiro [2.2] pentane, indene thiirane, and 1,7 dithiadispiro [2.2.2.2] decane.

It should also be understood that mixtures in all proportions of two or more sulfide or other polymerizable monomers such as the alkylene oxides may be charged together or separately, in serial or concurrent fashion, for the production of a wide variety of copolymers, terpolymers, etc. which generally comprise at least 50 mol percent of at least one aliphatic sulfide such as ethylene sulfide and propylene sulfide, and preferably no more than 25 mol percent of comer units, e.g. ethylene oxide.

While the reaction may be carried out in bulk, vapor phase, or as a solution in one or more of the monomers or a spinning solvent, the use of an inert organic solvent as a reaction medium is preferred. Suitable such solvents include benzene, toluene, xylene, dioxane, butanol, methylene chloride, dioxolane, dimethyl formamide, dimethyl acetamide, cyclohexane, dimethyl sulfoxide, anisole, dimethyl ether or ethylene glycol, etc.

Inert gases such as nitrogen are often employed as a blanket for the reaction to aid in quality control by preventing contamination in production, and may be continuously bubbled through the reaction zone for this purpose in conventional fashion.

Reaction temperatures may range from about −80 to about 150° C., but for ease of operation are generally maintained between about 0 and about 60° C. Optimum results have been obtained with temperatures between about 10 and about 40° C. Atmospheric pressure is preeminently suitable for effecting the polymerization reaction, and is of course preferred for simplicity, but it should be understood that moderate subatmospheric and superatmospheric pressures, e.g. 5 to 150 p.s.i. are not deleterious to the process and may be satisfactorily employed where desired.

The novel catalyst system of this invention comprises a Group II (Fisher) metal halide and an organic mercaptan, as well as the adducts, complexes, or reaction products thereof. Preferably, the metal halide is a derivative of a Group IIb metal, and particularly one having a single valence state of two, viz. cadmium or zinc, with zinc being particularly preferred for optimization of polymer color.

Representative metal halides include zinc chloride, cadmium bromide, mercuric chloride, magnesium fluoride, calcium chloride, beryllium iodide, barium chloride, strontium fluoride, etc.

It appears that the relatively more ionic members of the series, e.g. the zinc compounds, are to be preferred over the relatively more covalent, e.g. mercuric, members.

The organic mercaptan may comprise one or more —SH groups directly bonded to a carbon atom which forms part of the organic moiety, which in turn may be aliphatic or aromatic, cyclic, bicyclic or fused cyclic, saturated or unsaturated, but preferably is an aliphatic hydrocarbon chain having 1 to 18 carbon atoms.

The suitable organic thiols include methyl mercaptan (methanethiol), ethyl mercaptan, butyl mercaptan, propyl mercaptan, chloromethyl mercaptan, phenyl mercaptan, vinyl mercaptan, allyl mercaptan, benzyl mercaptan, cyclohexyl mercaptan, p-tolyl mercaptan, cyclopentyl mercaptan, 1,2-ethane dithiol, 1,4-butane dithiol, 1,3,3-pentane trithiol, 2-methoxy-5 octane thiol, 2,2 dichloro 4-butane thiol, 1,4 benzene dithiol, 2,2 dimethyl-4-butanethiol, 2-methoxy-5-pentanethiol, α-cyano γ-octanethiol, 1,3 dinitro 5-benzenethiol, 1,3 dihydroxy 5-benzenethiol, etc.

It may be desirable for the organic moiety of the mercaptan to be identical with, or similar to, the organic portion of the sulfide to be polymerized. Best results have been attained with the liquid alkyl mercaptans having 1 to 10 carbon atoms in a straight chain hydrocarbon structure, where the organic sulfides are the lower alkyl (e.g. 1 to 8 carbon atoms) thiiranes.

While the reaction products of the Group II metal halides and the organic mercaptans may be characterized as X-M-S-R, R-S-M-S-R. etc., or mixtures thereof (where X is halogen, M is a Group II metal, S is sulfur, and R is an organic moiety as described above) the indeterminate nature of the complexes and the inevitable mixtures of compounds that may be formed make it preferable to describe the catalyst by its pre-components and the term "reaction product," which is used in both the specification and claims hereof in the general sense, referring broadly to all such postulated complexes, adducts or compounds and any mixtures thereof.

The catalyst is generally employed in catalytic amounts, e.g. ranging from about 0.01 up to about 5.0 weight percent, preferably from about 0.1 up to about 2.0 weight percent, based upon the final reaction mixture, and may be prepared separately or in situ. Lower proportions are preferred for minimization of contamination of product, and have been found to yield excellent product at these levels, as distinguished from certain other ionic catalysts.

Where separately prepared, the catalytic components are added to an alcohol (e.g. methanol, ethanol, propanol, isobutanol), water, or an admixture thereof, the reaction product recovered by filtration and dried.

The polymerization reaction is generally begun by metering the organic sulfide, e.g. ethylene sulfide, preferably in liquid phase, to the reaction zone which may comprise a solvent such as benzene or methylene chloride; adjusting the polymerization conditions; and introducing the catalytic components where the catalyst is to be prepared in situ. Generally, however, the catalyst is preformed and is added to the reaction zone prior to commencing with the feed of organic sulfide monomer. While polymerization is immediately noticeable, the reaction is generally continued for a period of about 5 up to about 24 hours and the product removed, washed with a suitable solvent such as acetone, and dried.

The products generally exhibit an inherent viscosity as a 0.5 weight percent solution in parachlorophenone at 120° C. of above 0.1, preferably above 0.3. Inherent viscosities of about 0.5 and thermal decomposition rate constants (measured in a circulating air oven maintained at 230° C., and the result expressed as the average rate of weight loss per minute over the 45 minute test period) of less than 0.1, e.g. 0.05, were exhibited by most resins. Fibers of, e.g. 1 gram per denier and 10% elongation, could be readily spun from the melt. High melting points of, e.g. 210° C. for polyethylene sulfide were characteristic of the products, as was the excellent color of all samples, at optimum whiteness with the zinc-based catalysts.

While the resins are generally thermoplastic, crystalline, moldable materials of fiber-forming characteristics, it is to be understood that elastomeric materials may be prepared with conventional techniques such as the known heat setting process, and that similar modifications, e.g.

organic diisocyanate chain coupling may also be successfully carried out where desired.

Of course, any conventional additives, coloring agents or dyes, fillers, etc., such as titanium dioxide, glass, carbon black, mica, finely divided metals such as iron and calcium carbonates may be incorporated with the polymers to effect a variety of property modifications, or to provide decorative effects.

The following examples will serve to illustrate the various embodiments of this invention, and will generally supplement without limitation the description set forth hereinabove.

The remarkable properties of the novel catalyst system of this invention are exemplified as follows by comparison to similar ionic catalysts.

EXAMPLE I

Ten (10) parts of ethylene sulfide (analyzed by vapor phase chromatography as 99.5% pure) was freshly distilled through a 60 cm. Vigreux column into a receiver equipped with stirrer and two side arms. The side arms were capped with rubber septums and pierced with hypodermic needles through which was flowed a gentle stream of nitrogen. Prior to the distillation the entire apparatus was flame dried in a stream of nitrogen and cooled. The temperature was adjusted to desired polymerization temperatures and the catalyst introduced by injection through the septum. Polymerization conditions were maintained with stirring, and the resulting polymer was removed following reaction, and worked up by washing with acetone in a Waring Blendor three times, with filtering after each wash.

(A) Boron fluoride etherate

The following runs were carried out with boron fluoride ethereate as a catalyst:

| Catalyst | | Polymerization | | |
| --- | --- | --- | --- | --- |
| Type | Wt. percent | Temp., °C. | Time (hrs.) | Yield percent |
| BF$_3$Et$_2$O | 0.1 | −80 | 4 days | Small |
| BF$_3$Et$_2$O | 0.1 | 0 | 45 | 2.8 |
| BF$_3$Et$_2$O | 0.1 | 30 | 40 | 3.0 |
| BF$_3$Et$_2$O | 0.1 | 60 | 48 | 8.7 |
| BF$_3$Et$_2$O | 2.4 | 30 | 20 | 40.0 |

The resulting polymers yielded only very short, brittle fibers and were extremely unstable when heated at 230° C. A 2 gram sample heated at 230° C. for 30 minutes completely disappeared.

(B) Tributylamine

The foregoing polymerization was also carried out with tributylamine as the polymerization catalyst, as follows:

| Catalyst | | Polymerization | | |
| --- | --- | --- | --- | --- |
| Type | Wt. percent | Temp., °C. | Time (hrs.) | Yield percent |
| Tributylamine | 0.3 | 30 | 40 | 13.8 |
| Do | 10.0 | 30 | 48 | 93.0 |

This catalyst gave short, brittle fibers which, although of good thermal stability, appeared to be of low molecular weight.

(C) Cadmium chloride and butyl mercaptan

The isolated, solid, dry reaction product of 12.8 pts. of cadmium chloride and 10.0 pts. of butyl mercaptan (prepared in a methanol solution at room temperature with stirring for 60 minutes), was employed as a catalyst in the foregoing polymerization under the following conditions:

| Catalyst | | Polymerization | | |
| --- | --- | --- | --- | --- |
| Type | Wt. percent | Temp., °C. | Time (hrs.) | Yield percent |
| CdCl$_2$/BuSH | 0.5 | 30 | 24 | 71 |
| CdCl$_2$/BuSH | 1.0 | 20 | 48 | 91 |

Decomposition constants for each of the polymers was less than 0.01 weight percent per minute and long, yellowish fibers could be drawn from the melt at above 210° C.

(D) Zinc chloride and butyl mercaptan

The reaction product of zinc chloride and butyl mercaptan prepared as set forth in C above was utilized as the catalyst in the foregoing polymerization under the following conditions:

| Catalyst | | Polymerization | | |
| --- | --- | --- | --- | --- |
| Type | Wt. percent | Temp., °C. | Time (hrs.) | Yield percent |
| ZnCl$_2$/BuSH | 1.0 | 30 | 3 days | 87 |
| ZnCl$_2$/BuSH | 0.5 | 30 | 66 | 73 |

The products were of excellent white color, and long fibers could be drawn from the melt at 225° C.

As is apparent from the foregoing runs, excellent yields of high molecular weight, thermally stable, fiber-forming polymers could be obtained with the zinc and cadmium reaction products in low concentration, as distinguished from the low yields of low molecular weight, poor fiber-forming polymers obtained with boron fluoride etherate, and the low molecular weight products obtained in good yield with tributylamine polymers at high catalyst concentrations.

EXAMPLE II

Twenty (20) parts of ethylene sulfide was charged to a reaction vessel maintained at a temperature of 30° C., 0.05 part of a reaction product of cadmium chloride and butyl mercaptan (prepared as described in Example I–C) added thereto, and the reaction condition maintained for 72 hours.

17.1 parts of a yellowish polymer was recovered by filtration, washed three times with acetone, and air dried. The polymer had a melting point of 210° C. and exhibited a thermal decomposition rate constant of 0.01 weight percent per minute.

The polymer was formed into a rod by compression at 195° C. and holding for 30 minutes at 200° C., and spun at 218° C. through a standard 14 mil capillary with a piston activation pressure of 50 lbs. and a take-up speed of 1135 meters per minute, to a strong fiber of 1.9 denier, a tenacity of 0.2 gram per denier, and a 2% elongation.

EXAMPLE III

The procedure set forth in Example II was repeated, except that zinc chloride was substituted for cadmium chloride, and the catalytic reaction product thereof was employed in an amount of 0.05 part, representing 0.25 weight percent, based upon the monomer.

The 14.4 parts of recovered white product exhibited a melting point of 210° C. and a thermal decomposition rate constant of 0.01 weight percent per minute. The inherent viscosity of a 0.5 weight percent solution in p-chlorophenol at 120° C. was about 0.5.

Rods were formed from the polymer by compression at 195° C. and holding for 30 minutes at 200° C., and fibers spun at 215° C. through a standard 14 mil capillary with a 30 lb. piston activation pressure at take-up speeds of 1260 and 1905 meters per minute, which exhibited, respectively, deniers of 2.1 and 1.7, tenacities of 0.6 gram per denier, and elongation of 10 and 9 percent. The effect of the varied draw ratios upon the characteristics of the fiber indicated the polymer to be highly crystalline.

EXAMPLE IV

The procedure of Example III was repeated except that 0.2 part of the zinc reaction product was employed at a 1.0 weight percent level. An 82% yield of a white, fiber-forming polymer having a melting point of 210° C. and a thermal decomposition rate constant of 0.01 weight percent per minute was recovered.

Fibers were spun at 210° C. through a standard 14 mil capillary at a 10 lb. piston pressure with a take-up speed of 1560 meters per minute, the products exhibiting a denier of 0.6, a tenacity of 0.6 gram per denier and an 8% elongation.

EXAMPLE V

The polymerization of propylene sulfide was effected with a catalyst comprising a reaction product of zinc chloride and butyl mercaptan, prepared as in Example I, at a 1 weight percent level in bulk, at a temperature of 25° C. After 18 hours a 72 percent yield of a tacky product was obtained which exhibited an inherent viscosity of 0.5 (as an 0.5 weight percent solution of polymer in methylene chloride at 25° C.).

It is to be understood that the foregoing detailed description is given merely by way of illustration and that many variations may be made therein without departing from the spirit of my invention.

The embodiments of the invention in which an exclusive property or privilege is claimed are defined as follows:

1. A process for the preparation of sulfide polymers comprising polymerizing at least one sulfide having the following formula:

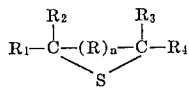

wherein $n$ is an integer of from zero to 1 and wherein $R_1$, $R_2$, $R_3$ and $R_4$ are substituents selected from the group consisting essentially of hydrogen, halogen, haloalkyl, nitro, hydroxy, cyano, alkoxy, carboxy, alkyl and cycloalkyl, in the presence of a catalytic amount of the reaction product of a zinc halide and an organic mercaptan, said organic mercaptan having the formula R—SH, wherein R is an alkyl group having up to 10 carbon atoms.

2. The process of claim 1 wherein the zinc halide is zinc chloride.

3. The process of claim 1 wheretin the catalyst is the reaction product of zinc chloride and butyl mercaptan.

4. The process of claim 1 wherein said polymerization is carried out at a temperature between about —80 and about 150° C.

5. The process of claim 1 wherein said sulfide has up to about 20 carbon atoms.

6. A process of claim 1 wherein said catalyst is present from about 0.01 to about 5 weight percent, based on the total reaction mixture.

7. The process of claim 1 for the preparation of polymeric alkyl sulfides which comprises
   (1) charging at least one alkyl thiirane having up to about 8 carbon atoms to a reaction zone comprising from about 0.01 up to about 5 weight percent, of the reaction product of a zinc halide and an alkyl mercaptan, wherein the alkyl group has up to about 10 carbon atoms, said reaction zone being maintained at a temperature between about 0 and about 60° C.;
   (2) polymerizing said alkyl thiirane in said reaction zone for a period of up to about 24 hours; and
   (3) recovering a thermoplastic, moldable, fiber-forming polyalkyl sulfide having an inherent viscosity in a 0.2 weight percent solution in parachlorophenone at 120° C. of above 0.1.

8. The process of claim 1 for the preparation of polyethylene sulfide which comprises polymerizing ethylene sulfide in the presence of from about 0.01 up to about 5.0 weight percent of the reaction porduct of zinc chloride and butyl mercaptan.

References Cited
UNITED STATES PATENTS 3,222,324  12/1965  Brodoway _____ 260—79.7
3,329,659   7/1967  Gobran  _____ 260—79

DONALD E. CZAJA, Primary Examiner

M. I. MARQUIS, Assistant Examiner

U.S. Cl. X.R.

260—429.9; 264—176